(12) United States Patent
Zaima (10) Patent No.: US 8,879,113 B2
(45) Date of Patent: Nov. 4, 2014

(54) IMAGE FORMING APPARATUS FORMING IMAGES IN ACCORDANCE WITH IMAGE FORMING CONDITIONS

(75) Inventor: Nobuhiko Zaima, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/540,831

(22) Filed: Jul. 3, 2012

(65) Prior Publication Data

US 2013/0016365 A1    Jan. 17, 2013

(30) Foreign Application Priority Data

Jul. 12, 2011 (JP) ................................ 2011-154262

(51) Int. Cl.
*G06K 15/02* (2006.01)
*H04N 1/405* (2006.01)
*G03G 15/01* (2006.01)
*G03G 15/00* (2006.01)

(52) U.S. Cl.
CPC .......... *G03G 15/0173* (2013.01); *G06K 15/027* (2013.01); *G03G 15/5054* (2013.01); *G06K 15/1868* (2013.01); *G03G 15/5041* (2013.01)
USPC .......................................... 358/1.2; 358/112

(58) Field of Classification Search
CPC .......... G03G 15/0173; G03G 15/5041; G06K 15/1868
USPC ........................................................... 382/112
See application file for complete search history.

(56) References Cited

U.S. PATENT DOCUMENTS

| | | | |
|---|---|---|---|
| 6,731,888 B2 | 5/2004 | Suzuki et al. | |
| 7,245,842 B2 | 7/2007 | Hino | |
| 2008/0219513 A1* | 9/2008 | Hasegawa | ..................... 382/112 |
| 2010/0315685 A1 | 12/2010 | Zaima | |

FOREIGN PATENT DOCUMENTS

JP    2005-157100 A    6/2005

* cited by examiner

*Primary Examiner* — Douglas Tran
*Assistant Examiner* — Justin Katzwhite
(74) *Attorney, Agent, or Firm* — Fitzpatrick, Cella, Harper & Scinto (57) ABSTRACT

A processor determines a combination of the result of a comparison between a statistical value indicating the graininess of small dots and a predetermined reference value SDa and the result of a comparison between a statistical value indicating the graininess of large dots and a predicted value SDp. This combination shows which factors degrade image quality and which image forming conditions should be corrected and to what extent. Thus, the processor selects the image forming conditions to be corrected based on a combination of these comparison results, determines their correction values, and corrects the selected image forming conditions using the correction values. This makes it possible to properly correct the image forming conditions that correspond to the factors affecting image quality.

11 Claims, 7 Drawing Sheets

| | SMALL DOTS | LARGE DOTS | CONTRAST POTENTIAL | PRIMARY TRANSFER VOLTAGE |
|---|---|---|---|---|
| i | ○ | ○ | — | — |
| ii | ○ | × | — | Down |
| iii | × | ○ | UP | — |
| v | × | × | UP | Down |

○ ··· $SD1 \leq SDa, SD2 \leq SDp$

× ··· $SD1 > SDa, SD2 > SDp$

# IMAGE FORMING APPARATUS FORMING IMAGES IN ACCORDANCE WITH IMAGE FORMING CONDITIONS

BACKGROUND OF THE INVENTION

1. Field of the Invention

The present invention relates to an image forming apparatus, such as an electrophotographic apparatus and the like, that performs imaging in accordance with image forming conditions.

2. Description of the Related Art

There have been proposed techniques for adjusting image quality to the desired characteristics by forming patterns on image carriers or printing media, reading the characteristics of the patterns, and correcting the density and tone of the images. In particular, Japanese Patent Laid-Open No. 2005-157100 has proposed measuring the shapes of the patterns to correct process conditions (image forming conditions). The image forming conditions include the amount of charge supplied to a photoreceptor used during regular imaging, the amount of light used to form latent images, as well as the developing bias and transfer bias.

Specifically, the invention set forth in Japanese Patent Laid-Open No. 2005-157100 involves measuring the shapes of patterns formed on a photoreceptor or an intermediate transfer member, predicting the quality of the output images based on the measurement results, and adjusting the image forming conditions. Furthermore, if the images are output from a terminal, said invention has proposed performing image processing by selecting, prior to image processing, the appropriate image processing method based on the measurement results and image quality prediction results obtained from an image forming apparatus.

However, in the case of the invention described in Japanese Patent Laid-Open No. 2005-157100, the wide variety of factors affecting the pattern shape characteristics that influence quality produces discrepancies between the image forming conditions subject to adjustment based on the pattern measurement results and the actual factors, thereby making correct feedback impossible. In addition, to find correct feedback targets, the measurements had to be performed quite a few times while varying the image forming conditions, which was very time consuming.

SUMMARY OF THE INVENTION

Thus, the characteristic feature of the present invention consists in properly correcting the image forming conditions that correspond to the factors affecting image quality.

The present invention notes that statistical values indicating the graininess of small dots and large dots are closely related to the factors that affect image quality and to the image forming conditions. Specifically, a combination of the result of a comparison between a statistical value indicating the graininess of small dots and a predetermined reference value and the result of a comparison between a statistical value indicating the graininess of large dots and a predicted value indicates which factors degrade image quality, and which image forming conditions should be corrected, and to what extent. Accordingly, the present invention consists in selecting the image forming conditions to be corrected based on such a combination of comparison results, determining their correction values, and correcting the selected image forming conditions using the correction values. This makes it possible to properly correct the image forming conditions that correspond to the factors affecting image quality.

The present invention provides an image forming apparatus comprising the following elements. An image formation unit forms patterns including at least small dots with a relatively small area and large dots with a relatively large area on an image forming surface of a printing medium or an image carrier. A detection unit detects the small dots and the large dots contained in the patterns formed on the image forming surface. A determination unit determines a statistical value indicating the graininess of the small dots detected by the detection unit, a statistical value indicating the graininess of the large dots detected by the detection unit, and a predicted value of the statistical value indicating the graininess of the large dots, predicted from the statistical value indicating the graininess of the small dots. A comparison unit obtains a result of a comparison between the statistical value indicating the graininess of the small dots and a predetermined reference value. The comparison unit further obtains a result of a comparison between the statistical value indicating the graininess of the large dots and the predicted value. A selection unit selects an image forming condition that corresponds to a combination of the result of a comparison between the statistical value indicating the graininess of the small dots and the predetermined reference value and the result of a comparison between the statistical value indicating the graininess of the large dots and the predicted value among a plurality of image forming conditions including charging conditions used when forming latent images, developing conditions used when developing the latent images, and transfer conditions used when transferring toner images formed by developing the latent images. A correction unit corrects the image forming condition selected by the selecting unit using a correction value corresponding to a combination of the result of a comparison between the statistical value indicating the graininess of the small dots and the predetermined reference value and the result of a comparison between the statistical value indicating the graininess of the large dots and the predicted value.

Further features of the present invention will become apparent from the following description of exemplary embodiments (with reference to the attached drawings).

DESCRIPTION OF THE EMBODIMENTS

Description of Image Forming Apparatus

Figure 1:
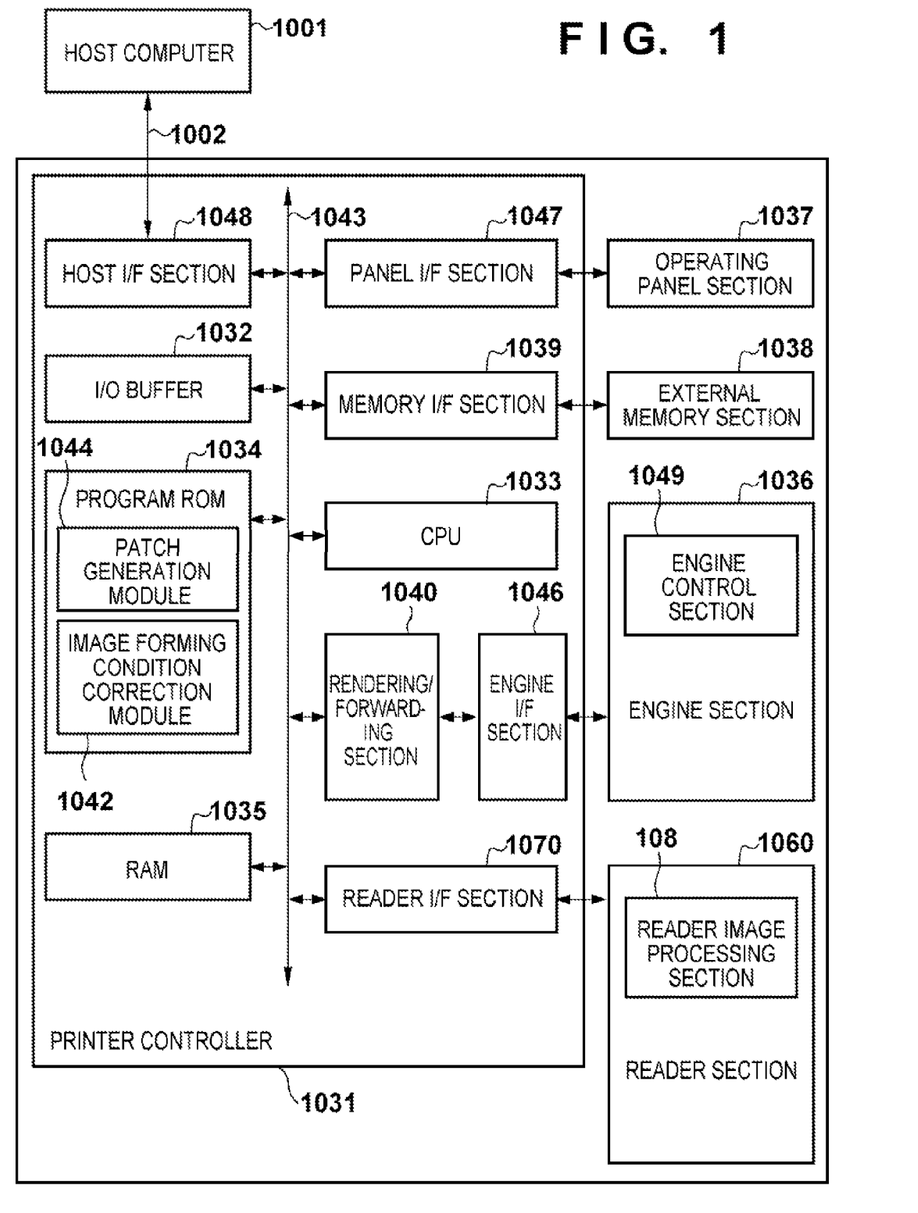
FIG. 1 is a block diagram illustrating the configuration of an image forming system.

FIG. 1 is a diagram illustrating the configuration of an image forming system according to an embodiment of the present invention. A host computer 1001, which is a personal computer, or the like, transmits print jobs to an image forming apparatus 1030 through a communication line 1002. A printer controller 1031, which forms part of the image forming apparatus 1030, is a control unit that administers the operation of the entire image forming apparatus. The printer controller 1031 has a host I/F section 1048 that manages the I/O to and from the host computer 1001. An I/O buffer 1032 performs transmission and reception of control codes and data to and from communication circuits through the host I/F section 1048. A CPU 1033 effects overall control of the entire printer controller 1031.

A program ROM 1034 stores control data and control programs run by the CPU 1033. A patch generation module 1044 and an image forming condition correction module 1042 are included as program modules in the program ROM 1034. When tone correction and image forming condition correction are carried out in cooperation with the CPU 1033, these program modules are used to transform luminance information and density information, generate patch images etc., and control the analysis etc. of the detected images.

The image information generation section 1041 can generate various image objects by configuring data received from the host computer 1001. The patch generation module 1044 generates image data for patterns containing small dots and large dots that are used in the process of correction of the image forming conditions. The image forming condition correction module 1042 measures the graininess of the patterns, performs statistical processing, selects the image forming conditions to be corrected, determines the correction values, and executes the process of correction.

A RAM 1035 is used as a work memory for the interpretation of control codes and data, for the calculations required for printing, or for the processing of print data. The results of the statistical processing of graininess, as well as the results of the calculation of the correction values, and the like are temporarily stored in the RAM 1035.

A rendering/forwarding section 1040 built into the printer controller 1031 renders image data corresponding to print jobs and image data generated by the patch generation module 1044 into bitmap images and forwards the bitmap images to an engine section 1036.

A reader section 1060, which includes a reader image processing section 108, reads images from originals and generates image data. The reader section 1060 and the printer controller 1031 are connected by a reader I/F section 1070. The engine section 1036 receives the image data outputted by the reader section 1060 through an engine I/F section and carries out the operation of copying, which involves printing images on an image forming surface of a printing medium. In addition, the engine section 1036, which includes an engine control section 1049, prints the bitmap images generated by the rendering/forwarding section 1040 on an image forming surface of a printing medium. Here, the engine control section 1049 controls the processing operations (e.g., transport operations, charging operations, development operations, transfer operations, and fixing operations, etc.) performed by various mechanisms that constitute the engine section 1036. The engine section 1036 and the printer controller 1031 are connected by an engine I/F section 1046.

As far as the operating panel 1037 is concerned, the printer controller 1031 is connected to the operating panel 1037 by a panel I/F section 1047. The CPU 1033 displays various information items and a user interface for the operator on the operating panel 1037. For example, instructions to the CPU 1033 to correct image forming conditions are issued by the operator through the operating panel 1037.

An external memory section 1038 is used for storing print data, various information items about the image forming apparatus, and the like. The printer controller 1031 and the external memory section 1038 are connected by a memory I/F section 1039. All the units in the printer controller 1031 are connected to a system bus 1043.

Construction of Image Forming Apparatus 1030

Figure 2:
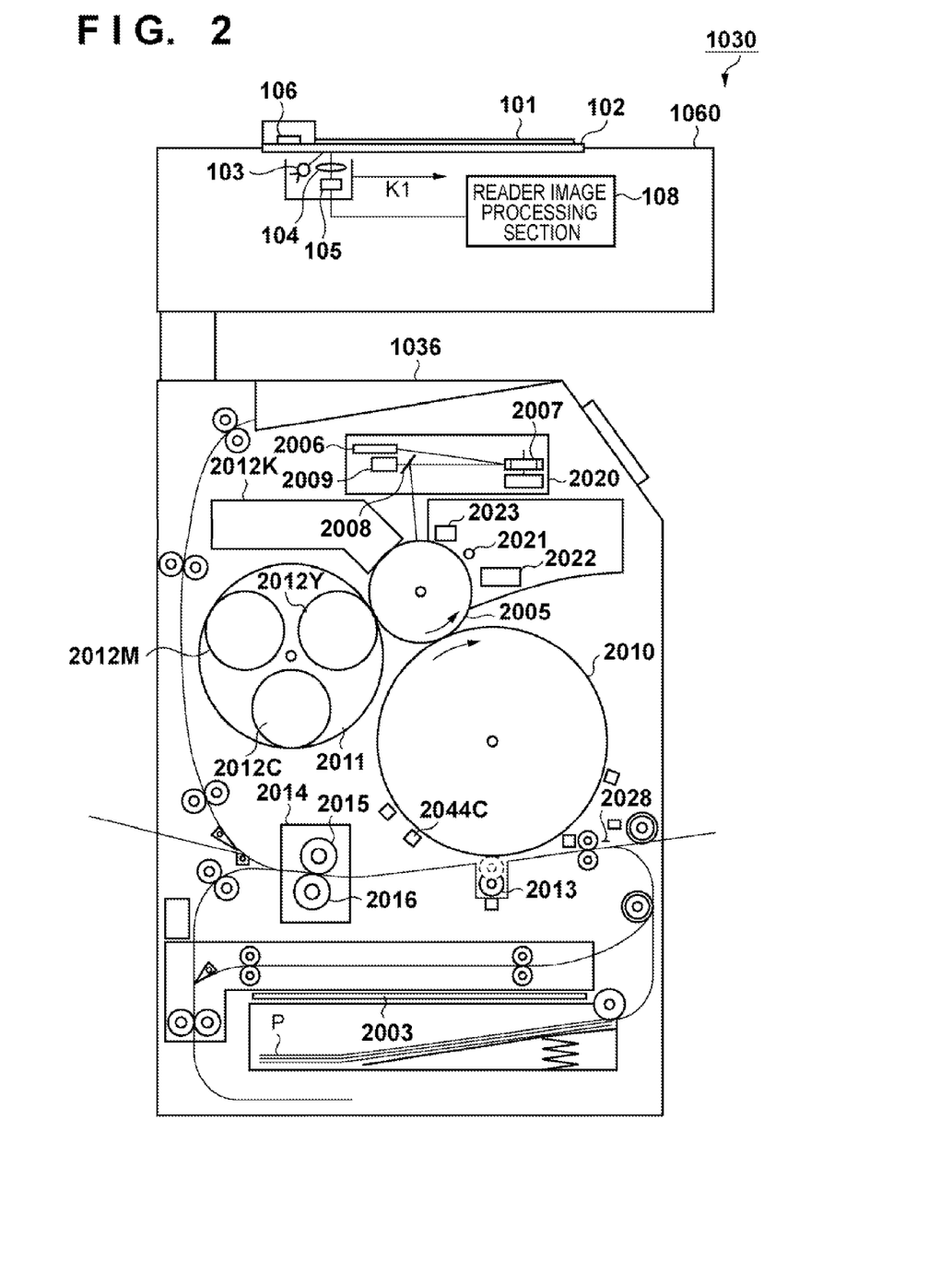
FIG. 2 is an exterior view illustrating an exemplary configuration of a color copying machine.

FIG. 2 is an exterior view that illustrates an exemplary configuration of a color copying machine used in a working example of the present invention. The image forming apparatus 1030 may be adapted to be connected to a printer and an image scanner through a cable or via a network. In FIG. 2, the image forming apparatus 1030 is equipped with a reader section 1060 and an engine section 1036. Mechanisms that form a reading device are provided inside the reader section 1060. In addition, there is provided a reader image processing section 108 that effects control of the read operations carried out by the mechanisms.

Mechanisms that are used to perform imaging are provided inside the engine section 1036. The above-described engine control section 1049 and printer controller 1031 are housed inside a control board housing section 2003. The mechanisms that form the engine section 1036 include an image forming mechanism, a fixing mechanism that fuses toner images transferred onto printing media P, a paper feed mechanism that feeds the printing media P, and a transport mechanism that conveys the printing media P.

Reader Section

An original 101 placed on an original glass platen 102 is irradiated with light from a light source 103. An image of the original 101 is formed in a CCD sensor 105 through an optical system 104. This reading optics unit transforms the original 101 into a sequence of electric signal data for every line as it moves in the direction of the arrow K1. It should be noted that prior to reading the original 101 the CCD sensor 105 reads a standard white reference plate 106. As a result, the reader image processing section 108 creates coefficients used for shading correction.

The reader image processing section 108 adjusts the gain of the image signal obtained by the CCD sensor 105, converts the image signal to digital data, and applies shading correction to the digital data, thereby producing image data. The image data is transmitted to the printer controller 1031 and further image processing appropriate for the characteristics of the image forming apparatus 1030 is carried out.

Image Forming Mechanism

The image forming mechanism forms an electrostatic latent image on the image forming surface of a photosensitive drum 2005 by laser beam scanning, develops the electrostatic latent image using toners to form a toner image, performs a primary transfer of the toner image to an intermediate transfer member 2010, and performs a secondary transfer of the multicolor image formed by the primary transfer to the printing media P. A laser scanner section 2020 is equipped with a laser driver 2006 that provides on-off drive for a laser beam emitted from a semiconductor laser, not shown, in accordance with the bitmap image supplied from the printer controller 1031. The laser beam emitted from the semiconductor laser is deflected by a rotating polygon mirror 2007. The direction of such deflection is customarily referred to as the main scanning direction. Directed through a reflecting mirror 2008 towards the photosensitive drum 2005, the laser beam exposes the image forming surface of the photosensitive drum 2005 in the main scanning direction. Once the laser beam is detected by a beam detector 2009, a detection signal is supplied to the control board housing section 2003. The engine control section 1049, which is mounted to the control board housing section 2003, generates a horizontal synchronizing signal that determines the timing of exposure in the main scanning direction based on the detection signal obtained from the beam detector 2009 and outputs this horizontal synchronizing signal to the printer controller 1031.

The photosensitive drum 2005 is charged to a uniform potential by a primary charging unit 2023 in accordance with an electric potential setting obtained through electric potential control, discussed below, and an electrostatic latent image is formed thereon by laser beam scanning. The electrostatic latent image is turned into a visible toner image with the aid of developers (toners) supplied by developing units, to be discussed below. The toner image that is rendered visible on the photosensitive drum 2005 is subjected to primary transfer onto the intermediate transfer member 2010, which has a primary transfer voltage of the opposite sign to the toner image applied thereto through fixed voltage control. During color image formation, whenever the intermediate transfer member 2010 makes a single revolution, the developing rotary 2011 rotates in a predetermined increment of angle. As a result, the developing units that develop the electrostatic latent image are switched.

The steps of the development process are carried out as a sequence including a yellow developing unit 2012Y, a magenta developing unit 2012M, a cyan developing unit 2012C, and a black developing unit 2012K. As the intermediate transfer member 2010 makes four revolutions, yellow, magenta, cyan, and black visible images are subjected to multiple transfers onto the image forming surface of the intermediate transfer member 2010. As a result, a multicolor visible image is formed on the image forming surface of the intermediate transfer member 2010.

In addition, during monochromatic image formation, the development process is performed only in the black developing unit 2012K. Namely, as the intermediate transfer member 2010 makes a single revolution, a black visible image is formed on the image forming surface of the intermediate transfer member 2010. Upon resumption of transport of the printing media P, which has been put on standby by the resist shutter 2028, a transfer roller 2013 presses the intermediate transfer member 2010 into contact with the printing media P. Since the transfer roller 2013 has a bias of the opposite sign to the toner applied thereto, the visible image formed on the intermediate transfer member 2010 undergoes a secondary transfer to the printing media P.

The photosensitive drum 2005 and the yellow developing unit 2012Y, magenta developing unit 2012M, cyan developing unit 2012C, and black developing unit 2012K are detachable. All the developing units other than the black one are housed in the developing rotary 2011. A cleaner 2022 removes residual toner from the photosensitive drum 2005. A pre-exposure lamp 2021 destaticizes the photosensitive drum 2005 with light. Density sensors 2044C, which measure the density of the pattern, i.e. the toner image, are disposed around the intermediate transfer member 2010. The density sensors 2044C may read the patterns instead of the reader section 1060.

Fixing Mechanism, Paper Feed Mechanism, Transport Mechanism

The fixing mechanism has a fusing unit 2014, which fuses toner images transferred onto the printing media P by heating and applying pressure thereto. The fusing unit 2014 includes a fixing roller 2015, which is used to apply heat to the printing media P, and a pressure roller 2016, which is used to press the printing media P into contact with the fixing roller 2015.

Correction of Image Forming Conditions

The image forming apparatus 1030 minimizes the graininess of the images formed on the printing media P and maintains excellent picture quality by indirectly detecting factors affecting image quality from the patterns and correcting the image forming conditions. The image forming conditions include, for example, charging conditions used when forming latent images, developing conditions used when developing the latent images, and transfer conditions used when transferring toner images formed by developing the latent images, and the like. Usually, the charging conditions (e.g., charging potential) and developing conditions (e.g., development potential) are image forming conditions that adjust the contrast potential. The transfer conditions include, for example, the transfer potential. These potentials are sometimes referred to as "bias". In the present invention, the CPU 1033 employs the reader section 1060 to read patterns formed on the image forming surface of the printing media P and corrects the image forming conditions that influence the graininess of the dots contained in the patterns based on the obtained results.

Figure 3:
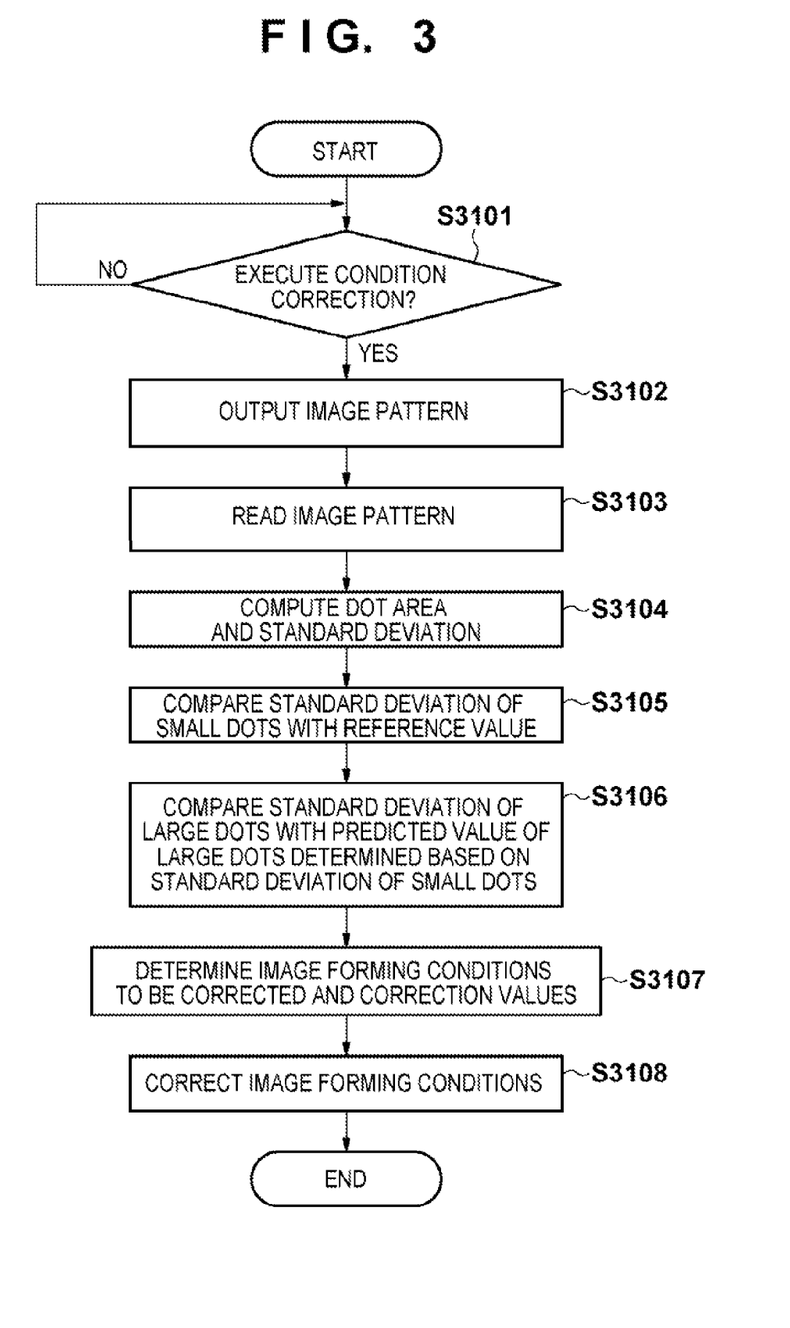
FIG. 3 is a flowchart describing the process of correction of the image forming conditions.

FIG. 3 is a flowchart depicting the process of correction of image forming conditions according to a working example. This flowchart illustrates the processing steps executed by the CPU 1033 in conjunction with the image forming condition correction module 1042.

In S301, the CPU 1033 determines whether an executable instruction to perform correction of image forming conditions has been entered via the operating panel 1037. If such an executable instruction has been entered, the process advances to S302. As part of the user interface, the operating panel 1037 is provided with an image forming condition correction button.

In S302, the CPU 1033 controls the printer controller 1031 and engine section 1036 to form patterns containing multiple dots of different sizes on the image forming surface of the printing media P. For example, the CPU 1033 activates the patch generation module 1044, directs it to create image data for a pattern, renders the image data into a bitmap image using the rendering/forwarding section 1040, and outputs it to the engine section 1036 via the engine I/F section 1046. The engine control section 1049 controls the engine section 1036 and forms a pattern on the printing media P in accordance with the input bitmap image. Thus, the engine section 1036 operates as an image formation unit that forms patterns including at least small dots of a relatively small area and large dots of a relatively large area on an image forming surface of a printing medium or an image carrier.

Figure 4:
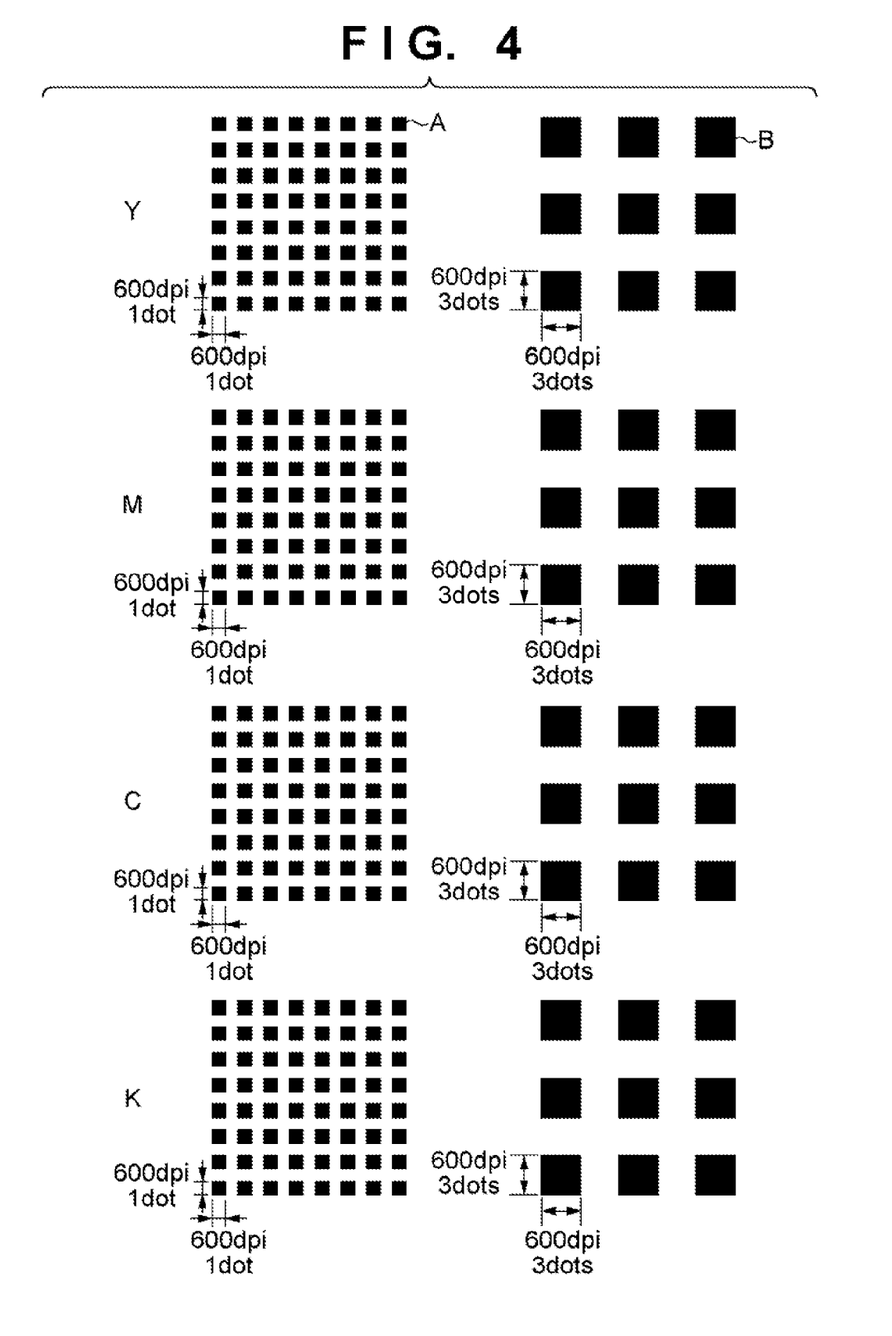
FIG. 4 is a diagram illustrating exemplary patterns containing multiple dots of different sizes.

FIG. 4 is a diagram illustrating exemplary patterns. The patterns include at least small dots of a relatively small area, which are shown in (A), and large dots of a relatively large area, which are shown in (B). In the example illustrated in FIG. 4, the small dots are constituted by 1×1 600 dpi dots. In addition, the large dots are constituted by 3×3 600 dpi dots. As FIG. 4 shows, both the small dots and the large dots are formed for each of the YMCK colors. While here the small dots and the large dots are similar, this is not essential. As long as there is a relationship that can be used to predict the statistical value of the large dots from the statistical value of the small dots, it is sufficient. Similarity between the shape of the small dots and the shape of the large dots is advantageous in terms of facilitating the prediction of the statistical value. In addition, although dots of two types, i.e. small dots and large dots, are used here, there may be three or more types of dot sizes.

In S303, the CPU 1033 receives the image data of the pattern read from the image forming surface of the printing media P by the reader section 1060 and stores it in the RAM 1035. This pattern includes both the small dots and the large dots. In other words, the reader section 1060 operates as a detection unit that detects the small dots and the large dots contained in the patterns formed on the image forming surface. In addition, the reader section 1060 operates as an image reading unit that reads the small dots and the large dots contained in the patterns formed on the image forming surface of the printing media.

In S304, the CPU 1033 analyzes the image data stored in the RAM 1035 and subjects it to statistical processing to determine a statistical value indicating the graininess of the small dots and a statistical value indicating the graininess of the large dots. The statistical values that indicate graininess are, for example, statistical values produced from actual dot area measurements. In addition, any kind of statistical values are acceptable as long as these are statistical values that can distinguish graininess, such as standard deviation or variance, etc. Standard deviation is used here as an example.

In order to detect the graininess of the small dots, the read resolution of the reader section 1060 is set to a resolution that is higher than the image forming resolution of the engine section 1036. For example, if the image forming resolution is 600 dpi, the read resolution is set to 4800 dpi. In this example, the read resolution is set to 8 times the image forming resolution, but it may be 2 times that or more. However, when this ratio becomes extremely large, the time required for computation is increased. Accordingly, a ratio that provides a good balance between the computation time and the precision with which graininess is computed may be found by experimentation or simulation.

In S304, the CPU 1033 measures the area of the small dots and the area of the large dots to obtain their respective actual measurement values and computes a standard deviation SD1 of the actual measurement values of the small dots and a standard deviation SD2 of the actual measurement values of the large dots.

"Graininess" is a measure that indicates the extent of coarseness visually recognized in images of uniform density. Granularity, which is a value obtained by computing the spatial frequency component of variation for each component of an RGB image signal, correcting the computed values using the visible spatial frequency characteristic, integrating the spatial frequency components, and correcting the integrated values for average lightness may be used as a rating value indicating graininess. The standard deviation of the dot area is strongly correlated with granularity. Accordingly, standard deviation can be used as a measure to assess graininess.

Figure 5:
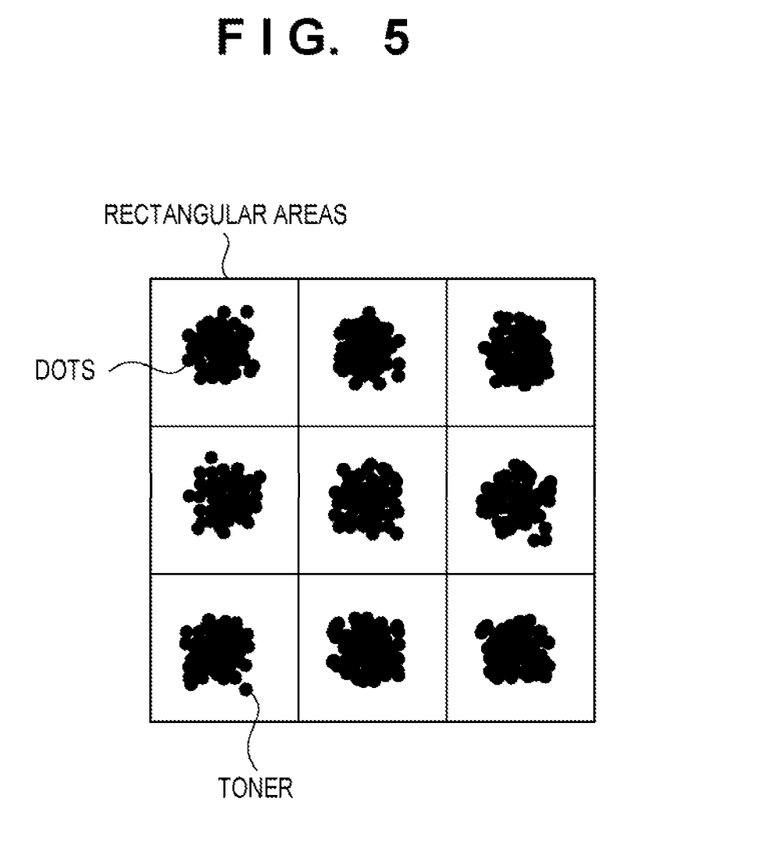
FIG. 5 is a diagram describing dot area measurement.

FIG. 5 is a diagram describing the method used for dot area measurement. The pattern is partitioned into multiple rectangular regions. A single dot is contained within each rectangular region. Each rectangular region is composed of multiple pixels. The CPU 1033 binarizes the pixel values (luminance values) of the pixels using a predetermined threshold value. As a result, the pixels are classified into low-luminance pixels (black pixels) and high-luminance pixels (white pixels). The CPU 1033 computes the dot area in each rectangular region as a value obtained by multiplying the area of a single pixel by the number of pixels classified as low-luminance. Furthermore, the CPU 1033 computes a standard deviation from this dot area. Thus, the CPU 1033 binarizes the luminance values of the multiple pixels constituting a 1-dot reading range and computes a statistical value per 1 dot by statistically processing the binarized luminance values.

In S305, the CPU 1033 compares the standard deviation SD1 (graininess) of the small dots with a reference value SDa and stores the result of the comparison in the RAM 1035. The reference value SDa, which is stored in advance in the program ROM 1034, is the standard deviation SD1 of the small dots obtained when the image forming conditions of the image forming apparatus 1030 are correct. It is assumed that the reference value SDa is computed in advance by testing or simulation.

In S306, the CPU 1033 computes a predicted value SDp of the standard deviation of the large dots, which is predicted from the standard deviation SD1 of the small dots, and compares the standard deviation SD2 of the actual measurement values of the large dots with the predicted value SDp. Thus, the CPU 1033 operates as a comparison unit that obtains the result of a comparison between the statistical value indicating the graininess of the small dots and the predetermined reference value SDa and the result of a comparison between the statistical value indicating the graininess of the large dots and the predicted value SDp. The CPU 1033 stores the comparison results in the RAM 1035. The predicted value SDp of the large dots is computed from a function or a table representing the relationship between the standard deviation SD1 of the small dots and the standard deviation SD2 of the large dots obtained when the transfer conditions and fixing conditions of the image forming apparatus 1030 are correct. In other words, the CPU 1033 operates as a determination unit that determines the predicted value SDp of the statistical value indicating the graininess of the large dots predicted from the statistical value indicating the graininess of the small dots.

Figure 6:
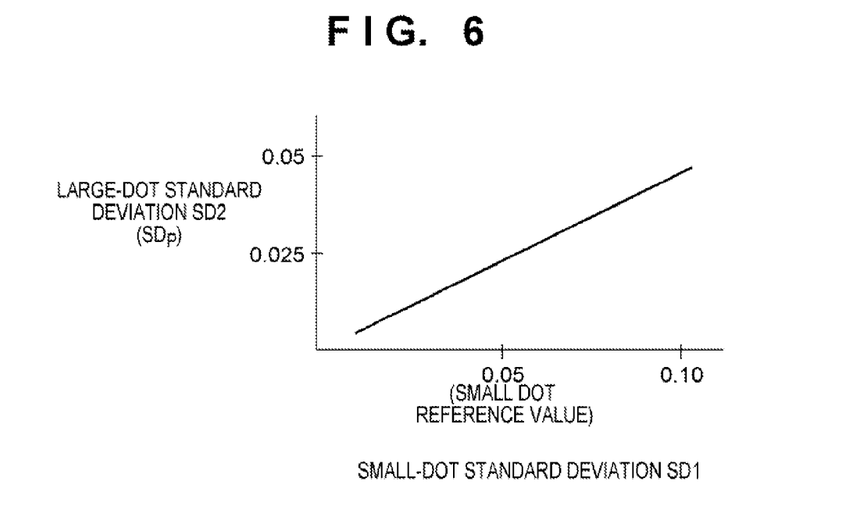
FIG. 6 is a diagram illustrating the relationship between the standard deviation SD1 of small dots and the standard deviation SD2 of large dots in the ideal case.

FIG. 6 is a diagram illustrating the relationship between the standard deviation SD1 (predicted value SDp) of the small dots and the standard deviation SD2 of the large dots in the ideal case. A function or a table that represents this relationship, which is obtained in advance by testing or simulation, is built into the image forming condition correction module 1042. The relationship between the standard deviation SD1 of the small dots and the standard deviation SD2 of the large dots illustrated in FIG. 6 is linear, but it does not necessarily have to be linear. In other words, this relationship may be represented by a higher-order function.

In S307, the CPU 1033 selects the image forming conditions to be corrected based on a combination of the small dot comparison results and the large dot comparison results. It should be noted that it is assumed that a correspondence between this combination and the image forming conditions is represented in tabular form and built into the image forming condition correction module 1042 in advance. Thus, the CPU 1033 operates as a selection unit that selects the image forming conditions that correspond to a combination of the result of a comparison between the statistical value indicating the graininess of the small dots and the predetermined reference value SDa and the result of a comparison between the statistical value indicating the graininess of the large dots and the predicted value SDp among a plurality of image forming conditions including charging conditions used when forming latent images, developing conditions used when developing the latent images, and transfer conditions used when transferring toner images formed by developing the latent images.

Figure 7:
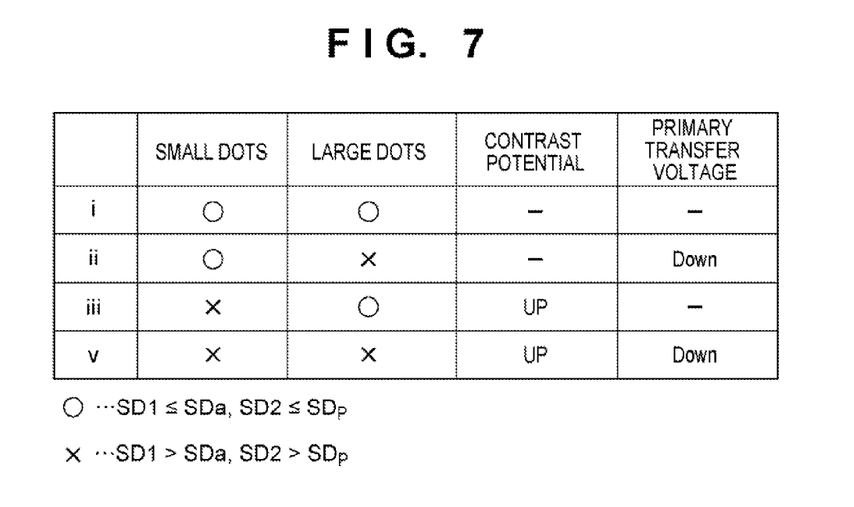
FIG. 7 is a table illustrating a combination of small dot comparison results and large dot comparison results, as well as the image forming conditions to be corrected.

FIG. 7 shows a table illustrating a combination of small dot comparison results and large dot comparison results, as well as the image forming conditions to be corrected. According to FIG. 7, when the graininess of the small dots is inadequate (the standard deviation exceeds the reference value SDa), it shows that one of the image forming conditions, the contrast potential, needs to be made higher than the present value. Accordingly, if the statistical value indicating the graininess of the small dots exceeds the predetermined reference value SDa, the CPU 1033 selects charging conditions or developing conditions as the image forming conditions subject to correction. The "present value" means a value used when forming a pattern.

On the other hand, when the graininess of the large dots is inadequate (the standard deviation SD2 exceeds the predicted value SDp), it shows that the primary transfer voltage, one of the image forming conditions, needs to be made lower than the present value. Thus, if the statistical value indicating the graininess of the large dots exceeds the predicted value SDp, the CPU 1033 selects transfer conditions as the image forming conditions to be corrected.

Figure 8:
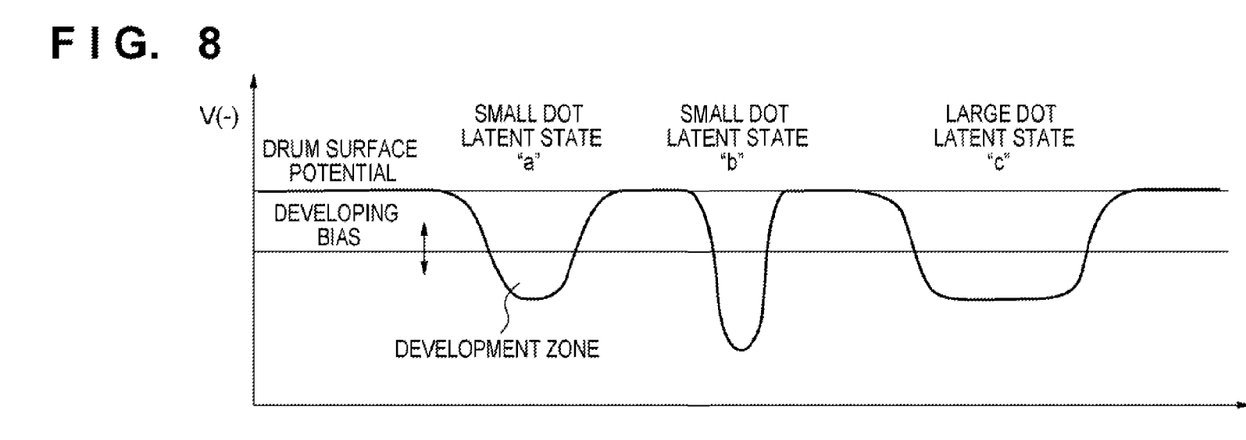
FIG. 8 is a picture showing an electrostatic latent image on a photosensitive drum.

The reasons why the image forming conditions subject to correction are determined in this manner will now be described in detail. State "a" in FIG. 8 shows that the electrostatic latent image of the small dots formed on the image forming surface of the photosensitive drum 2005 is small and shallow, thereby making the developed mass (which corresponds to the area of the development zone in the figure) subject to significant changes as a result of minute fluctuations in electric potential. State "b" in FIG. 8 shows that the developed mass of the small dots can be stabilized by increasing the contrast potential. State "c" in FIG. 8 shows that the effect of minute fluctuations in electric potential on the latent image of the large dots is smaller. Therefore, the effects of the latent image properties and development properties on graininess can be verified using the standard deviation SD1 of the area of the small dots.

On the other hand, one of the factors that produce considerable effects on graininess when the effects of the latent image properties and development properties are excluded is toner fly-off, which occurs when toner flies off through a gap in the primary transfer section before the photosensitive drum 2005 comes in contact with the intermediate transfer member 2010. Another factor is transfer failure due to toner polarity reversal caused by excessive charge supply. It tends to occur when the primary transfer voltage is higher than the ideal value. Accordingly, it can be said that the effects of the transfer conditions on graininess can be verified using the standard deviation SD2 of the area of the large dots not susceptible to being influenced by the latent image properties and development properties. Accordingly, when the standard deviation SD2 of the area of the large dots exceeds the predicted value SDp, the CPU 1033 reduces the primary transfer voltage.

Figure 9A:
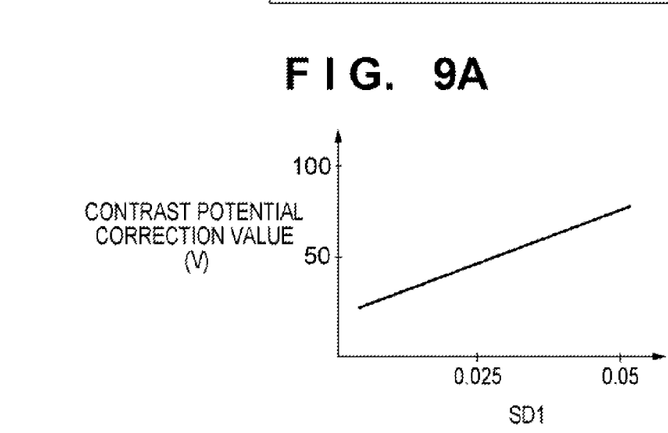
FIGS. 9A and 9B are diagrams illustrating a combination of small dot comparison results and large dot comparison results, as well as a function or table representing the correction values of the image forming conditions.
Figure 9B:
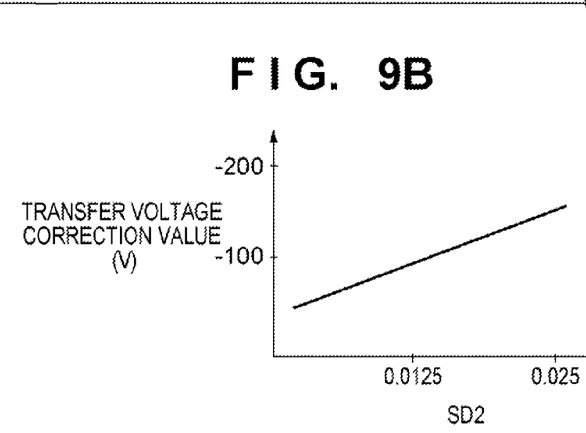

FIGS. 9A and 9B illustrate a combination of small dot comparison results and large dot comparison results, as well as a function or table representing the correction values of the image forming conditions. FIG. 9A illustrates the correspondence between the correction value of the image forming condition (contrast potential) and the differential $\Delta$ SD1 between the standard deviation SD1 of the small dots and the reference value SDa. In other words, applying the differential $\Delta$ SD1, which is the result of small dot comparison, to the correspondence illustrated in FIG. 9A allows for obtaining the correction values of the image forming conditions (contrast potential) corresponding to the comparison results.

FIG. 9B illustrates the correspondence between the correction values of the image forming conditions (primary transfer voltage) and the differential $\Delta$ SD2 of the standard deviation SD2 of the large dots and the predicted value SDp. In other words, applying the differential $\Delta$ SD2, which is the result of large dot comparison, to the correspondence illustrated in FIG. 9B makes it possible to obtain the correction values of the image forming conditions (primary transfer voltage) corresponding to the comparison results.

It is assumed that the correspondence illustrated in FIG. 9A and FIG. 9B is represented as a table or function and built into the image forming condition correction module 1042 in advance. Thus, the CPU 1033 determines the correction values of the charging conditions or developing conditions by entering the statistical value indicating the graininess of the small dots into a predetermined function or table. In addition, the CPU 1033 determines the correction value of the transfer condition by entering the statistical value indicating the graininess of the large dots into the predetermined function or table.

In S308, the CPU 1033 uses the determined correction values to correct the selected image forming conditions and stores them in the RAM 1035 as the image forming conditions to be used when executing print jobs and copying jobs. Therefore, the CPU 1033 operates as a correction unit that corrects image forming conditions using correction values corresponding to a combination of the result of a comparison between the statistical value indicating the graininess of the small dots and the predetermined reference value SDa and the result of a comparison between the statistical value indicating the graininess of the large dots and the predicted value SDp.

The CPU 1033 uses the corrected image forming conditions as a target when executing automatic tone correction. The CPU 1033 may skip automatic tone correction if the image forming conditions are not corrected. Automatic tone correction is well known and will not be discussed in detail.

Thus, in the present working example, it is noted that statistical values indicating the graininess of small dots and the large dots are closely related to the factors that affect image quality and to image forming conditions. Specifically, a combination of the result of a comparison between the statistical value indicating the graininess of small dots and the predetermined reference value SDa and the result of a comparison between the statistical value indicating the graininess of large dots and the predicted value SDp indicates which factors degrade image quality, and which image forming conditions should be corrected, and to what extent. Accordingly, the present invention consists in selecting image forming conditions to be corrected based on this combination of comparison results, determining their correction values, and correcting the selected image forming conditions using said correction values. This makes it possible to properly correct the image forming conditions that correspond to the factors affecting image quality.

Although the above-described working example involved using the reader section 1060 to read patterns, the density sensors 2044C may also be used for reading. The density sensors 2044C are optical line sensors arranged in a linear manner in a direction perpendicular to the direction of rotation of the intermediate transfer member 2010. Accordingly, the density sensors 2044C can read the entire area of the image forming surface of the intermediate transfer member 2010 at high-resolution (e.g., 4800 dpi) as the intermediate transfer member 2010 rotates. The image signal generated by the density sensors 2044C is sent to the CPU 1033 of the printer controller 1031. In this manner, the density sensors 2044C operate as an image reading unit that reads the small dots and the large dots contained in the patterns formed on the image forming surface of the printing medium. It should be noted that the density sensors 2044C may be used to read patterns formed on the image forming surface of the photosensitive drum 2005 instead of the intermediate transfer member 2010. In such a case, the density sensors 2044C are disposed in locations where they can read the image forming surface of the photosensitive drum 2005.

Reading the patterns formed on the image forming surfaces of image carriers in this manner offers the advantage of avoiding the consumption of the printing media P.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-154262, filed Jul. 12, 2011 which is hereby incorporated by reference herein in its entirety.

What is claimed is:

1. An image forming apparatus comprising:
an image formation unit including a photosensitive member, a charging unit configured to charge the photosensitive member, an exposure unit configured to expose the photosensitive member charged by the charging unit to form an electrostatic latent image, a developing unit configured to develop the electrostatic latent image to form an image on the photosensitive member, and a transferring unit configured to transfer the image from the photosensitive member to a printing medium;
a control unit configured to cause the image formation unit to form a pattern image including a first dot and a second dot of an area that is larger than that of the first dot;
an obtaining unit configured to detect the pattern image and obtain first graininess information indicating graininess of the first dot and second graininess information indicating graininess of the second dot;
a predicting unit configured to predict third graininess information regarding the second dot based on the first graininess information obtained by the obtaining unit;
a selection unit configured to select an image forming condition to be corrected among charging conditions of the charging unit, developing conditions of the developing unit, and transfer conditions of the transferring unit, based on the first graininess information obtained by the obtaining unit, the second graininess information obtained by the obtaining unit, and the third graininess information predicted by the predicting unit; and
a correction unit configured to correct the image forming condition selected by the selecting unit.

2. The image forming apparatus according to claim 1, wherein the first graininess information is a statistical value of actual measurement values of an area of the first dot, and the second graininess information is a statistical value of actual measurement values of an area of the second dot.

3. The image forming apparatus according to claim 2, wherein the obtaining unit computes standard deviations or variances as the statistical values.

4. The image forming apparatus according to claim 1, wherein the selection unit selects the charging condition or the developing condition as the image forming condition corrected by the correction unit if the first graininess information exceeds a predetermined reference value.

5. The image forming apparatus according to claim 4, wherein the correction unit determines a correction value of the charging condition or the developing condition by entering the first graininess information into a predetermined function or table.

6. The image forming apparatus according to claim 1, wherein the selection unit selects the transfer condition as the image forming condition corrected by the correction unit if the second graininess information exceeds the third graininess information.

7. The image forming apparatus according to claim 6, wherein the correction unit determines a correction value of the transfer condition by entering the second graininess information into a predetermined function or table.

8. The image forming apparatus according to claim 1, wherein the obtaining unit comprises an image reading unit that reads the first dot and the second dot contained in the pattern image formed on the printing medium.

9. The image forming apparatus according to claim 1, wherein the obtaining unit comprises an image reading unit that reads the first dot and the second dot contained in the pattern image formed on the photosensitive member.

10. The image forming apparatus according to claim 8, wherein the image reading unit reads dots formed by the image formation unit at a resolution higher than the resolution of said dots, and
the obtaining unit binarizes luminance values of a plurality of pixels constituting a reading range in the image reading unit per 1 dot formed by the image formation unit and computes a statistical value per 1 dot by statistically processing the binarized luminance values.

11. The image forming apparatus according to claim 1, wherein the first dot and the second dot are separately arranged in a two-dimensional manner.

* * * * *